(12) United States Patent
Mosig

(10) Patent No.: US 8,284,797 B2
(45) Date of Patent: Oct. 9, 2012

(54) METHOD FOR WIRELESS DATA TRANSFER

(75) Inventor: Ruediger Mosig, Munich (DE)

(73) Assignee: SONY Deutschland GmbH, Cologne (DE)

( * ) Notice: Subject to any disclaimer, the term of this patent is extended or adjusted under 35 U.S.C. 154(b) by 661 days.

(21) Appl. No.: 10/590,602

(22) PCT Filed: Feb. 23, 2005

(86) PCT No.: PCT/EP2005/001898
§ 371 (c)(1),
(2), (4) Date: Jan. 11, 2007

(87) PCT Pub. No.: WO2005/081456
PCT Pub. Date: Sep. 1, 2005

(65) Prior Publication Data
US 2008/0232299 A1  Sep. 25, 2008

(30) Foreign Application Priority Data

Feb. 25, 2004 (EP) .................... 04004268

(51) Int. Cl.
*H04J 3/22* (2006.01)

(52) U.S. Cl. ........ 370/466; 370/389; 370/467; 370/469; 455/11.1; 455/41.2; 455/41.3; 455/552.1; 455/553.1

(58) Field of Classification Search .......... 455/11.1, 455/41.2, 41.3, 552.1, 553.1; 370/389, 466, 370/467, 469
See application file for complete search history.

(56) References Cited

U.S. PATENT DOCUMENTS

| | | | |
|---|---|---|---|
| 6,625,168 B1 * | 9/2003 | Langer et al. ................. | 370/466 |
| 6,906,818 B1 * | 6/2005 | Makishima ................. | 358/1.15 |
| 6,907,227 B2 * | 6/2005 | Fujioka ........................ | 455/41.3 |
| 6,937,612 B1 * | 8/2005 | Mauger et al. ................ | 370/465 |
| 7,263,362 B1 * | 8/2007 | Young et al. .................. | 455/450 |
| 2002/0065041 A1 * | 5/2002 | Lunsford et al. ................ | 455/41 |
| 2002/0085511 A1 * | 7/2002 | Koponen et al. ............. | 370/315 |
| 2002/0085516 A1 | 7/2002 | Bridgelall | |
| 2002/0136226 A1 | 9/2002 | Christoffel et al. | |
| 2002/0196771 A1 | 12/2002 | Vij et al. | |
| 2004/0017800 A1 * | 1/2004 | Lupper et al. ................. | 370/352 |

FOREIGN PATENT DOCUMENTS

| | | |
|---|---|---|
| EP | 1 199 842 | 4/2002 |
| WO | 02/01807 | 1/2002 |
| WO | 02/073430 | 9/2002 |

* cited by examiner

*Primary Examiner* — Jean Gelin
*Assistant Examiner* — Amanuel Lebassi
(74) *Attorney, Agent, or Firm* — Oblon, Spivak, McClelland, Maier & Neustadt, L.L.P.

(57) ABSTRACT

A method for wireless data transfer between first and second multimedia devices connected via a wireless connection operated according to a first wireless standard or to a second wireless standard, which are different from and/or not compatible with each other. The method includes: choosing the first wireless standard or the second wireless standard as a chosen wireless standard; processing connection commands, connection parameters, and/or connection data to obtain processed connection commands, processed connection parameters, and/or process connection data of the chosen wireless standard; and sending the process connection commands, process connection parameters, and/or process connection data out via the wireless connection according to the chosen wireless standard. The method thus enables a seamless switching from one wireless standard to another wireless standard, wherein upper layers do not notice the switching.

21 Claims, 6 Drawing Sheets

METHOD FOR WIRELESS DATA TRANSFER

BACKGROUND

The invention relates to a method for wireless data transfer between a first multimedia device and a second multimedia device, and to a multimedia device having a wireless connection with a further multimedia device.

There exist different standards for wireless data transfer between multimedia devices. Examples for wireless standards are: Ultra Wide Band (UWB), Bluetooth, IEEE802.11a, and IEEE802.11b. Each of these standards has certain advantages and disadvantages with respect to several aspects, such as e.g. power consumption, range, and bit rate (see FIG. 1). While e.g. the power consumption of the Bluetooth standard is low, its bit rate and range are rather small. In contrast, the bit rate of the IEEE802.11a standard is rather high at a wider range and at a higher power consumption. When using an existing method for wireless data transfer, the method may not make an optimal use of the available resources.

Also, when using an existing method for wireless data transfer, a wireless connection between different multimedia devices is often interrupted when the standard of the wireless connection is switched to another wireless standard. If e.g. an application of a multimedia device has a Bluetooth connection with a multimedia device, and the standard of the wireless connection must be switched from the Bluetooth standard to the IEEE802.11b standard, then the Bluetooth connection is generally interrupted and, after the interruption of the Bluetooth connection, a new connection according to the IEEE802.11b standard is established. After establishment of the IEEE80211.b connection, the data transfer can continue. However, this has the disadvantage for a user that due to the interruption of the old connection and the establishment of the new connection, he might experience a significant drop in the quality of service, e.g. with respect to bit rate and jitter.

SUMMARY

It is an object of the invention to provide a method for wireless data transfer, which allows a seamless switching between different wireless standards without breaking an ongoing data stream. It is a further object of the invention to provide a multimedia device that enables a seamless switching between different wireless standards without breaking an ongoing data stream.

To achieve this object, the invention provides a method for wireless data transfer according to claim 1. In addition, the invention provides a wireless data transfer system, computer program product, a computer readable storage medium and a multimedia device as defined in claims 16, 17, 18, and 19, respectively. Further features and preferred embodiments are respectively defined in respective sub-claims and/or in the following description.

The method for wireless data transfer between a first multimedia device and a second multimedia device, which first multimedia device and second multimedia device are connected via a wireless connection that is operated according to a first wireless standard or to a second wireless standard, which first wireless standard and second wireless standard are different from and/or not compatible with each other, comprises the following steps:

An application data receiving step in which application commands, application parameters and/or application data of said first wireless standard are received from an application of said first multimedia device.

A connection layer processing step in which said application commands, application parameters and/or application data are processed in order to obtain respective connection commands, connection parameters and/or connection data of said first wireless standard. If e.g. the application is an internet application, then the connection layer processing step provides all the steps according to the transmission control protocol (TCP). This means, in this example said connection commands, connection parameters and/or connection data are TCP data. The connection commands, connection parameters and connection data may also be e.g. User Datagram Protocol (UDP) data, Bluetooth data or ZigBee. Regarding the delimitation between "application", i.e. application layer (processing step), and "Connection", i.e. connection layer (processing step), note that everything above connection layer is an application. For example in an operating system, the connection layer typically is part of the operating system and needs a driver, whereas an application typically is a piece of software that e.g. can be bought in a shop. Typically, an application makes use of the connection layer via function calls, for example: "operating system, please make a Bluetooth connection to device B."

A choosing step in which said first wireless standard or said second wireless standard is chosen as chosen wireless standard.

An adaptation layer processing step in which said connection commands, connection parameters and/or connection data are processed in order to obtain processed connection commands, processed connection parameters and/or processed connection data of said chosen wireless standard. In particular, if said chosen wireless standard is different from said first wireless standard, within said adaptation layer processing step, a standard conversion is performed. This means e.g. that a connection command, connection parameter and/or connection data of said application wireless standard are converted into respective processed connection commands, processed connection parameters and processed connection data of said chosen wireless standard. One connection command thereby may be converted into one or several processed connection commands. It is also possible that several connection commands are converted into only one processed connection command. The same applies to connection parameters and connection data. This means, that the processing within the adaptation layer processing step may mean to change the packet size of connection data with respect to the packet size of processed connection data. Also, the command set of the connection commands may be converted into a respective command set of the processed connection commands according to the chosen wireless standard. In a typical usage scenario of the invention, the first wireless standard may be e.g. the Bluetooth standard, i.e. the application has a Bluetooth connection with a respective Bluetooth handle. However, the chosen wireless standard may be the IEEE802.11b standard. Then, within said adaptation layer processing step, the Bluetooth connection commands, Bluetooth connection parameters and/or Bluetooth connection data are converted or processed in order to obtain IEEE802.11b connection commands, IEEE802.11b connection parameters and/or IEEE802.11b connection data.

A sending step in which said processed connection commands, processed connection parameters and/or processed connection data are sent out via said wireless connection according to said chosen wireless standard. In the above example this means e.g. that a Bluetooth connection of said application is routed over an IEEE802.11b wireless connection by converting the Bluetooth commands, Bluetooth parameters, and Bluetooth data in the above described way and then sending out respective IEEE802.11b connection commands, IEEE802.11b connection parameters and/or IEEE802.11b connection data.

The above defined method considers the sending of data from an application via a connection layer, an adaptation layer, and a wireless layer. However, the concept of the invention is likewise applicable, if data is received and provided to an application. In this case, a receiving method for wireless data transfer between a first multimedia device and a second multimedia is defined as follows. Said first multimedia device and second multimedia device are connected via a wireless connection that is operated according to a first wireless standard or to a second wireless standard, which first wireless standard and second wireless standard are different from and/or not compatible with each other. Said receiving method comprises the following steps:

A transmission data receiving step in which transmitted wireless data are received that have been transmitted via said wireless connection according to a chosen wireless standard that is equal to said first wireless standard or to said second wireless standard. In a preferred embodiment, said chosen wireless standard may either be said first wireless standard or said second wireless standard.

An adaptation layer processing step in which said transmitted wireless data are processed in order to obtain connection commands, connection parameters and/or connection data of said first wireless standard. As above, said chosen wireless standard may be different from said first wireless standard and therefore, within said adaptation layer processing step, a standard conversion is performed in an analogue way as explained above.

A connection layer processing step in which said connection commands, connection parameters and/or connection data of said first wireless standard are processed in order to obtain respective application commands, application parameters and/or application data of said first wireless standard.

An application data processing step in which said application commands, application parameters and/or application data are provided to an application of said first multimedia device.

One idea of the invention is therefore to provide an adaptation layer processing step which performs a standard conversion in case said chosen wireless standard is different from and/or not compatible with said first wireless standard. In case the two standards are the same or compatible, no standard conversion is performed, i.e. the adaptation layer processing step consists of passing on data without any modification. It should be mentioned what is meant by "compatible standards" in the sense of the invention: If e.g. the application is an internet application, then within the connection layer processing step for example all processing steps according to the transmission control protocol (TCP) are performed. The IEEE802.11a standard is compatible with the TCP/IP standard. In this example, within the adaptation layer processing step no standard conversion is necessary.

The adaptation layer therefore realizes one or any plurality of the following three tasks: Command conversion, parameter conversion and data conversion. Command conversion means translating a command of said first wireless standard into a corresponding command of said chosen wireless standard. For example, a Bluetooth command may be converted into a corresponding WLAN command. Parameter conversion can for example mean that the length of a packet is described in bytes in said first wireless standard and may be described in milliseconds in said chosen wireless standard. Data conversion is e.g. needed when a certain data format has to be mapped to another data format. An example is an audio codec. Over Bluetooth, an MP3 audio codec might be used, however, another wireless standard may require to transcode, e.g. convert this into linear PCM.

In case of a switching of said chosen standard from said first wireless standard to said second wireless standard, the following steps are performed:
opening a new and temporarily additional wireless connection between said first multimedia device and said second multimedia device operating according to said second wireless standard,
choosing said second wireless standard as chosen wireless standard,
operating said new wireless connection as said wireless connection. If the remaining original connection is not needed any more, the original connection is closed.

This means, according to the invention, a seamless switching of the wireless standard of the wireless connection from said first wireless standard to said second wireless standard is realized by the following steps:
opening a new and temporarily additional wireless connection according to said second wireless standard,
using said adaptation layer processing step, i.e. an adaptation layer for standard conversion of the connection commands, connection parameters, and/or connection data from the first wireless standard to the second wireless standard, thus obtaining said processed connection commands, processed connection parameters, and/or processed connection data of said chosen wireless standard that is equal to said second wireless standard,
sending out said processed connection commands, processed connection parameters, and/or processed connection data via said new wireless connection according to said second wireless standard.

In a preferred embodiment, said method for wireless data transfer realizes a point-to-point connection between said first multimedia device and said second multimedia device. This means, that no complex network functions are necessary and the invention provides a simple solution for the connection of two multimedia devices that are connected via a wireless connection. In other words, in this preferred embodiment the topology never changes and there is always a point-to-point connection, i.e. no other devices that said first multimedia device and said second multimedia device are involved.

Preferably, said adaptation layer processing step is performed within an adaptation layer. Further, said connection layer processing step is preferably performed in a connection layer and said sending step is performed within a wireless layer. The adaptation layer thus realizes an interface between said connection layer and said wireless layer.

Further, said wireless standard may be different from and/or not compatible with said first wireless standard, such that a standard conversion is performed within said adaptation layer processing step. As mentioned above, in case of the above defined method, this may mean that one connection command or one connection parameter is converted into one or several processed connection commands or processed connection parameters. In case of the above defined receiving method this may mean that transmitted commands and/or transmitted parameters that are contained within said transmitted wireless data are converted into one or more respective connection commands or connection parameters. For example, the connection layer may send the command "UWB_Send_Data", which is an example for a connection command in case of an ultra wide band (UWB) connection. Then, within the adaptation layer processing step, this command "UWB_Send_Data" is converted into a command compatible with the set of commands of the chosen wireless standard, e.g., the command "UWB_Send_Data" may be converted into the command "WLAN_Send_Data". In this example, the application would have an ultra wide band (UWB) connection and the wireless layer would have a wide area local network (WLAN) connection. Since the application has an ultra wide band (UWB) connection, in this example, the application would also send a command "UWB_Send_Data", however in the format of an application command, i.e. the connection command "UWB_Send_Data" and the application command "UWB_Send_Data" do not necessarily have the exact same format, however the same intention.

Said chosen wireless standard may be chosen depending on properties of said wireless connection, the distance between said first multimedia device and said second multimedia device, and/or depending on direct requests from said application.

Preferably, said chosen wireless standard is chosen depending on the battery condition of said first multimedia device and/or depending on the battery condition of said second multimedia device. If e.g. the battery of the first multimedia device and/or the second multimedia device becomes low, i.e. almost empty, it may be better to use a chosen wireless standard that consumes as less energy as possible. If e.g. the wireless standard of said wireless connection is currently the IEEE802.11b standard that has a relatively high power consumption and the battery of said first multimedia device is low, then the system immediately switches to the Bluetooth standard as wireless standard. If a wireless standard with a low power consumption is not available because the user carrying said first multimedia device is far away from said second multimedia device, a warning message may be displayed to the user asking him to move closer to said second multimedia device. It may also be possible that the standard is switched depending on the power supply status of said first multimedia device and/or said second multimedia device. If e.g. the first multimedia device runs on battery, the Bluetooth standard may be selected. If, however, the first multimedia device is connected to a main power supply by the user, i.e. the first multimedia device does not run on battery anymore. Then, another wireless standard may be chosen, e.g. the IEEE802.11a or IEEE802.b standard. In other words, a wireless standard consuming little power is chosen, if said first multimedia device and/or said second multimedia device runs on battery, whereas a faster wireless standard with a higher power consumption is chosen if the respective device is connected to a main power supply, i.e. the respective device does not run on battery. Said properties of said wireless connection may comprise signal strength, quality of service, energy efficiency, and/or the like. This means, the signal strength, quality of service, energy efficiency and/or the like of all possible or available wireless standards that may be used, for said wireless connection are observed and said chosen wireless standard is chosen that is best suited at the current moment. The choosing with respect to energy efficiency means to take into account the power consumption of all possible or available wireless standards and choose a wireless standard as chosen wireless standard that consumes or uses only very little power. Thereby, the needed bitrate may also be taken into account. For example, if a low bitrate application is running over wireless LAN (WLAN), it may be more efficient to switch to Bluetooth, because it generally consumes less power at a sufficient bitrate. This may not necessarily have to be tied to the battery condition of the devices. Devices like personal digital assistants (PDA) or mobile phones are struggling for low power consumption all the time, not only when the batteries are close to being empty, i.e. it is desirable to use as few power as possible all the time. In other words, if said wireless connection has a high bitrate and high power consumption and the high bitrate is not needed by the application, preferably the wireless standard is switched to a different wireless standard with a lower but sufficient bitrate consuming less power, i.e. said chosen wireless standard is chosen to be a standard with a lower bitrate and lower power consumption. It may also be possible to choose said chosen wireless standard depending on a frequency band indicator. A frequency band indicator indicates which frequency bands are currently being disturbed by other radio signals and which frequency bands are available, i.e. free for the use. For example, Bluetooth and IEEE802.11b are operating in the same frequency band. If Bluetooth is disturbed due to another radio signal in that frequency band, it is very likely that also IEEE802.11b will be disturbed and it would not make sense to switch to IEEE802.11b. However, IEEE802.11a is operating in another frequency band, so if the frequency band indicator signals that another frequency band is currently better, i.e. available to use, within said choosing step, said chosen wireless standard may be a standard with a free to use frequency band.

If e.g. said wireless connection is operated according to the Bluetooth standard and the user walks around with said first multimedia device, then the signal strength of the wireless connection may become low, if the user walks out of the range or almost out of the range of the area that can be covered with the Bluetooth standard (typically around 10 m). The drop in signal strength is then detected. It may be possible that said first multimedia device and said second device alternatively communicate according to the IEEE802.11b standard as wireless standard. The range of the IEEE802.11b is larger than the range of the Bluetooth standard. Therefore, a new wireless connection is established between said first multimedia device and said second multimedia device, said new wireless connection operating according to the IEEE802.11b standard. Then, the data transfer is switched from the wireless connection that is operated according to the Bluetooth wireless standard to the new wireless connection that is operated according to the IEEE802.11b standard by using said adaptation layer.

In a preferred embodiment said distance between said first multimedia device and said second multimedia device is determined based on positioning system data, e.g. global positioning system (GPS) data or position data of the planned European Galileo positioning system. Therefore, said first multimedia device and/or said second multimedia device may comprise a positioning system for determining the position of said first multimedia device and/or said second multimedia device.

In a preferred embodiment, said choosing of said wireless standard is performed by a management unit. The management unit therefore observes said properties of said wireless connection, the distance between said multimedia device and said second multimedia device and the battery condition or battery status.

In a further preferred embodiment of the present invention, said first multimedia device is a video camcorder and said second multimedia device is a data processing means. In this embodiment the user may be walking around freely with his video camcorder in his hands while transferring data to said data processing means. This means, the user does not have to suffer from an interruption of the connection if the wireless standard is switched.

Said data processing means and/or said first multimedia device may be a personal computer, a notebook, a video recorder, a television set, a personal digital assistant (PDA), a portable phone, a mobile video viewer, mobile gaming device, e.g. Gameboy-type, mobile audio player, e.g. Walkman or MP3-player, wireless headphone and/or the like.

Further, said management unit may inform said application which wireless standard is chosen and said application adjusts the bit rate of said application data accordingly, depending on the chosen wireless standard. If e.g. the wireless standard is switched from IEEE802.11b standard to the Bluetooth standard, then the management unit may inform the application to reduce the bit rate. This may be necessary because the maximum possible bit rate of the Bluetooth standard is smaller than the maximum possible bit rate of the IEEE802.11b standard.

Said first wireless standard and said second wireless standard may be any of the following standards: Ultra wide band (UWB), IEEE802.11, e.g. IEEE802.11a, IEEE802.11b, or IEEE802.11g, IEEE802.15/WPAN, IEEE802.15.1, IEEE802.15.3 (Wireless personal area network (WPAN)), IEEE802.15.3a, IEEE802.15.4, IEEE802.11a, IEEE802.11b, Bluetooth (BT), and ZigBee. Further, said connection commands, connection parameters, and or connection data may correspond to any of the following standards or specifications (de-facto standards): UDP, TCP, or Bluetooth.

It should be noted that the invention is not limited to being used for seamless switching between different standards or de-facto standards, e.g. Bluetooth or ZigBee, but can also be applied to proprietary wireless systems. A famous area where currently proprietary wireless systems are dominating is the market for wireless mouse devices for personal computers (PCs). Basically, each manufacturer has its own wireless system which is not a standard and therefore is not compatible to other manufacturers devices at all, e.g. it is not possible to use a Microsoft wireless mouse together with a Logitech receiver.

This means, that the term "wireless standard" here does not mean that an e.g. international standard is meant, but any kind of system that describes how wireless data is transmitted. This means, it could be more appropriate to use the term "wireless system" instead of "wireless standard", thus indicating that the invention is not limited to a specific standard that has been agreed upon by a standardization committee.

A special case concerns ultra wide band (UWB). Currently, there exists neither a fixed standard nor a specification. However, it will be probably be called IEEE802.15.3a. In addition, it can be expected that there will be an additional specification by an industry group on top of IEEE802.15.3a. Of course, the invention is likewise applicable for this kind of upcoming standards.

A wireless data transfer system according to the invention is capable of and/or has means for performing or realizing a method for wireless data transfer as defined above. Further, a computer program product according to the invention comprises computer program means adapted to perform and/or to realize a method for wireless data transfer as defined above and/or the steps thereof, when it is executed on a computer, a digital signal processing means, and/or the like. An inventive computer-readable storage medium comprises a computer program product as defined above.

An inventive multimedia device that is connected with a further multimedia device via a wireless connection that is operated according to a first wireless standard or a second wireless standard, which first wireless standard and second wireless standard are different from and/or not compatible with each other, comprises:

- A connection layer adapted for receiving application commands, application parameters and/or application data of said wireless standard from an application layer, and further adapted for processing said application commands, application parameters and/or application data, thus generating respective connection commands, connection parameters and/or connection data of said first application wireless standard.
- A choosing unit adapted for choosing said first wireless standard or said second wireless standard as chosen wireless standard.
- An adaptation layer adapted for processing said connection commands, connection parameters and/or connection data thus generating processed connection commands, processed connection parameters and/or processed connection data of said chosen wireless standard.
- Sending means for sending out said processed connection commands, processed connection parameters and/or processed connection data via said wireless connection according to said chosen wireless standard.
- A management unit adapted for choosing said chosen wireless standard depending on signal strength, quality of service and/or the like of said wireless connection, the distance between said multimedia device and said further multimedia device, and/or depending on direct requests from said application.

Said chosen wireless standard may be different from and/or not compatible with said first wireless standard, and said adaptation layer is adapted for performing a standard conversion. In a preferred embodiment said multimedia device is a video camcorder, personal computer, notebook, video recorder, television set, personal digital assistant (PDA), or a portable phone.

BRIEF DESCRIPTION OF THE DRAWINGS

The invention and advantageous details thereof will be explained by way of exemplary embodiments thereof in the following with reference to the accompanying drawings, in which.

DETAILED DESCRIPTION

Figure 1:
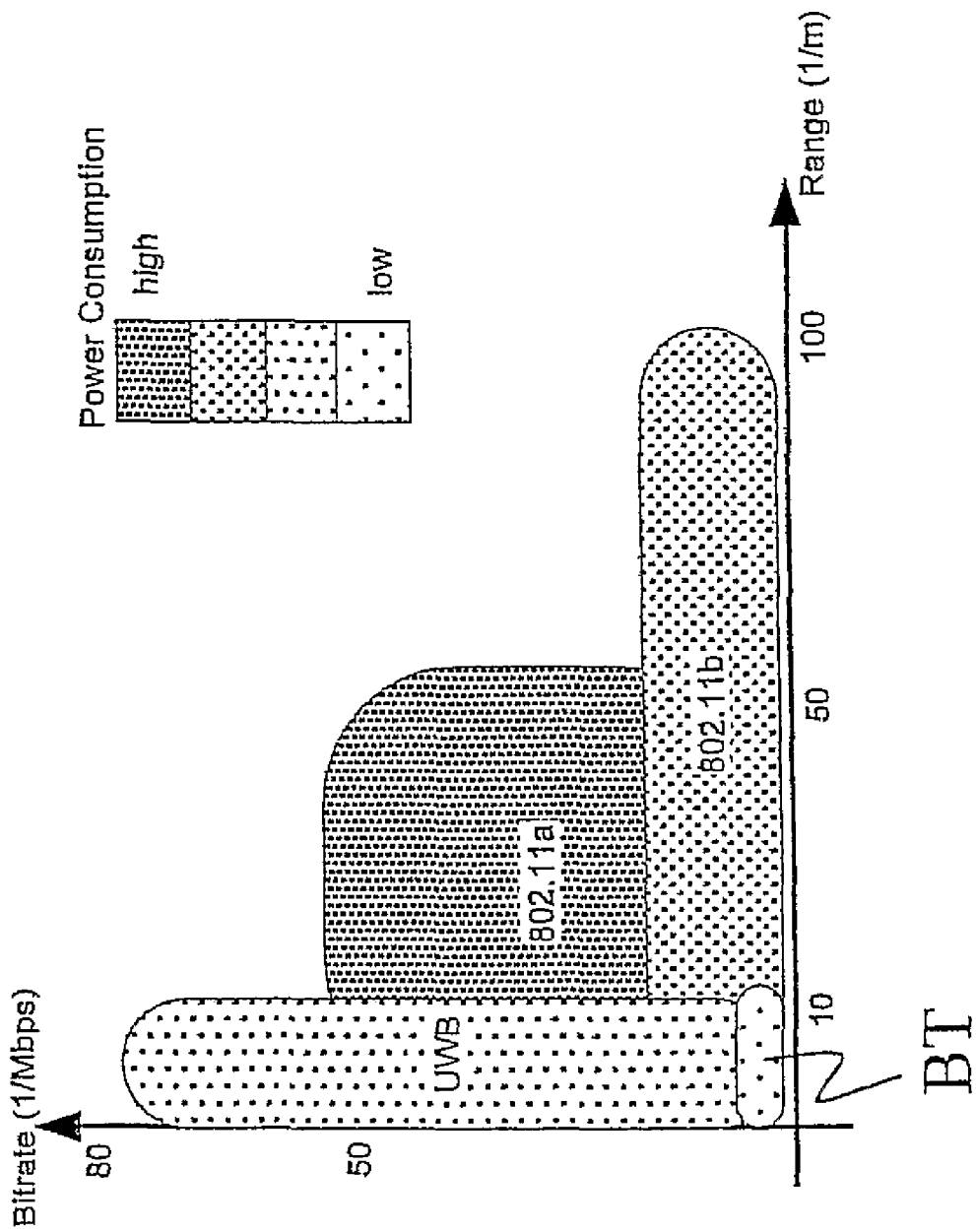
FIG. 1 shows the properties of different wireless standards.

In FIG. 1 the bit rate, range, and power consumption of different wireless standards are displayed. The different wireless standards are: IEEE802.11a, IEEE802.11b, ultra wide band UWB, and Bluetooth BT. In the preceding enumeration the power consumption ranges from high to low, i.e. the IEEE802.11a standard has the highest power consumption whereas the Bluetooth standard BT has the lowest power consumption.

The different standards have the following typical power consumption:

| Bluetooth | 200 mW |
|---|---|
| IEEE802.11b | approx. 1 W |

It should be noted that these values are difficult to compare, because they are very much situation dependent and vary widely.

The different standards have different ranges given in the following:

| IEEE802.11b | approx. 100 m |
|---|---|
| IEEE802.11a | approx. 50 m |
| Ultra wide Band UWB | approx. 10 m |
| Bluetooth BT | 10 m or 100 m (depending on Bluetooth-type) |

The bit rate of these standards is approximately as follows:

| Ultra wide band UWB | around 100 Mbps (Megabits per second) |
|---|---|
| IEEE802.11a | approx. 55 Mbps |
| IEEE802.11b | approx. 10 Mbps |
| Bluetooth BT | up to 720 kbps (kilo bits/second). |

Regarding ultra wide band (UWB) it should be noted that the closer two devices are, the higher the speed. Extremely close devices may achieve bitrates up to several hundred Mbps, but in a normal usage distance, it will be around 100 Mbps.

Figure 2:
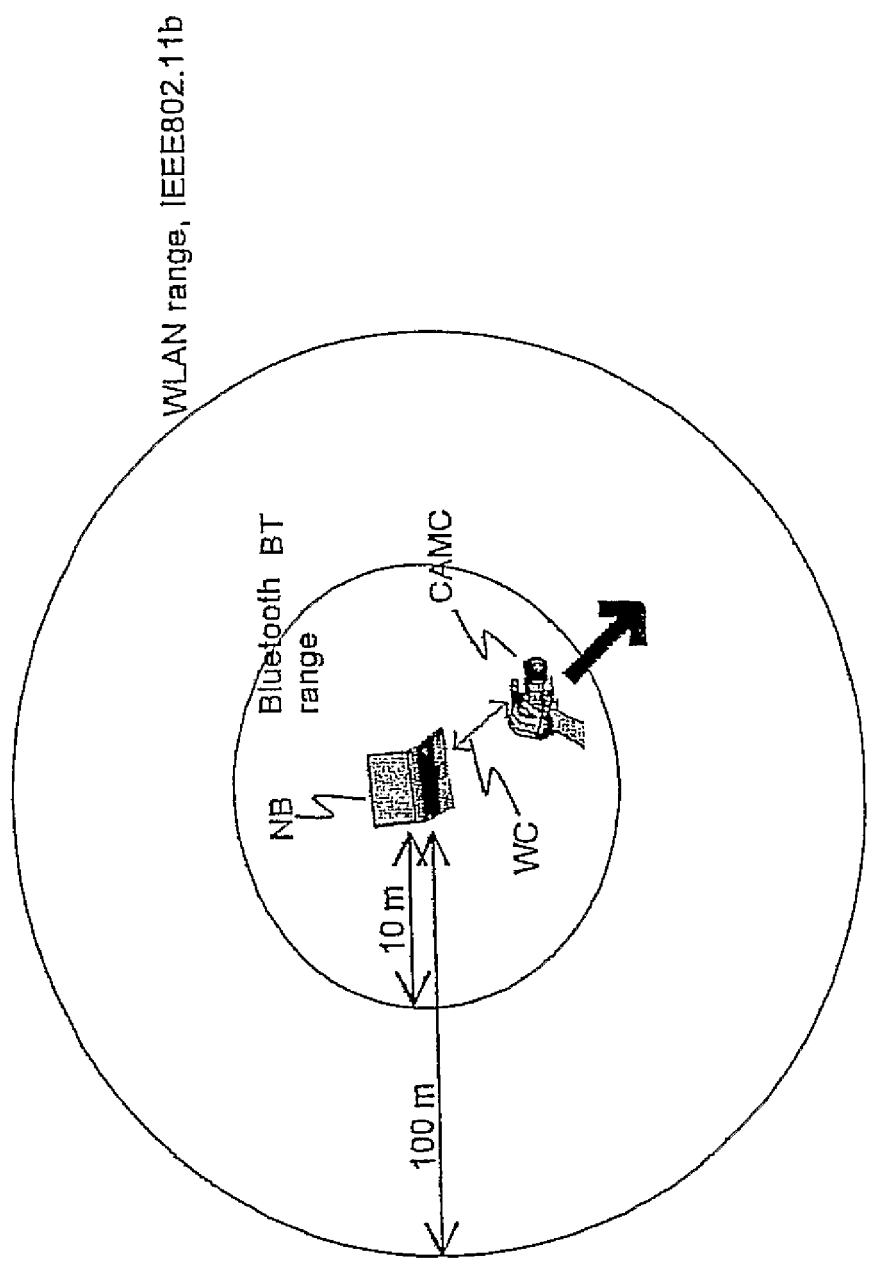
FIG. 2 shows a typical usage scenario of the invention.

FIG. 2 shows the range of the Bluetooth standard BT and the range of a wireless LAN network WLAN, which is operated according to the IEEE802.11b standard. FIG. 2 further shows a notebook NB that has a wireless connection WC with a video camcorder CAMC. The wireless connection WC of FIG. 2 is a Bluetooth BT connection. If the user walks out of the range of Bluetooth BT, then, in prior art the wireless connection WC is interrupted. As a consequence the user experiences several inconveniences, such as e.g. lost data, poor picture quality, and/or the like.

In FIG. 2 the notebook NB and the video camcorder CAMC are both equipped with an IEEE802.11b receiver. However, if the user has left the Bluetooth BT range according to prior art even if different standards such as in the example the IEEE802.11b standard is available, the user still experiences the above mentioned inconveniences. This is because prior art systems do not provide a seamless switching between different wireless standards.

The invention especially targets at improving the above described situation in connection with FIG. 2. This means, the invention may be used in the above scenario for switching the wireless standard from the Bluetooth BT standard to the IEEE802.11b standard. If the user walks out of the range of Bluetooth BT with the video camcorder CAMC, then the invention provides a seamless switching to the IEEE802.11b standard.

Figure 3:
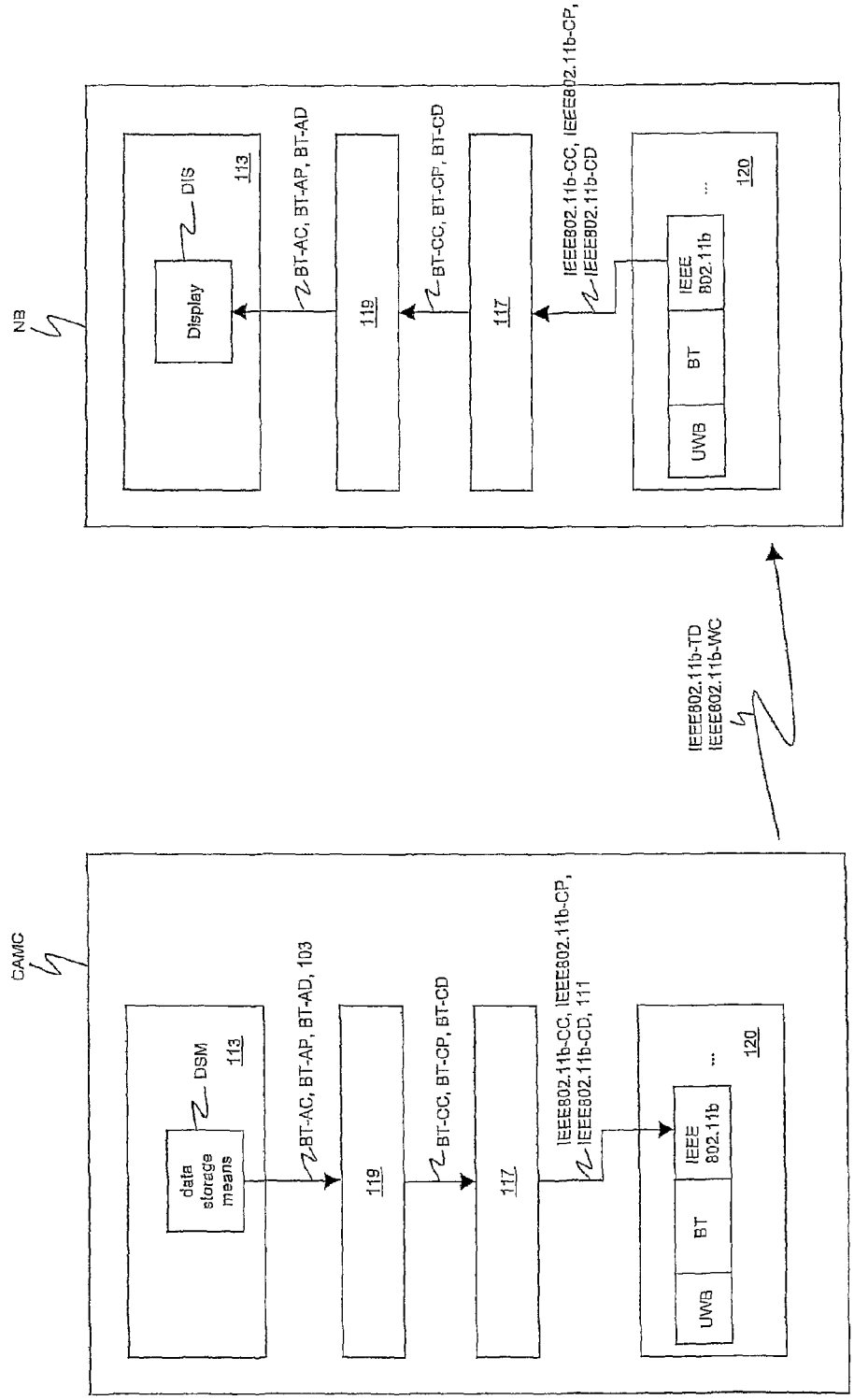
FIG. 3 shows a block diagram for explaining the steps of the invention.

FIG. 3 shows a block diagram illustrating the standard conversion by using an adaptation layer 117. FIG. 3 shows the video camcorder CAMC on the left hand side and the notebook NB on the right hand side. The video camcorder CAMC has an application layer 113 with a data storage means DSM. The data storage means DSM provides data, e.g. video data that shall be transmitted via an IEEE802.11b wireless connection IEEE802.11b-WC.

However, the user has started to transfer video data from the video camcorder CAMC to the notebook NB while he was in the Bluetooth range. Therefore, the video camcorder CAMC and the notebook NB have at first established a Bluetooth connection. This means, the application layer 113 has at first, i.e. before a switching, used Bluetooth application commands BT-AC, Bluetooth application parameters BT-AP and Bluetooth application data BT-AD to communicate via a Bluetooth application connection 103 with a connection layer 119 of the video camcorder CAMC. Within said connection layer 119, the Bluetooth application commands BT-AC, Bluetooth application parameters BT-AP, and Bluetooth application data BT-AD are processed in order to obtain Bluetooth connection commands BT-CC, Bluetooth connection parameters BT-CP, and Bluetooth application connection data BT-CD. While the Bluetooth connection between the video camcorder CAMC and the notebook NB was used for data transfer, these commands have been provided directly to a Bluetooth BT interface within a wireless layer 120. In this case, the adaptation layer 117 passes the Bluetooth connection commands BT-CC, Bluetooth connection parameters BT-CP, and Bluetooth connection data BT-DC directly, i.e. without modification to the wireless layer 120.

When the user walks out of the range of Bluetooth BT, the invention provides a seamless switching, in the example of FIG. 3 to the IEEE802.11b wireless standard. One aspect to enable the seamless switching is the use of said adaptation layer 117. In the example of FIG. 3, said adaptation layer 117 is used to modify said Bluetooth connection commands BT-CC, Bluetooth connection parameters BT-CP and Bluetooth connection data BT-CD in order to obtain IEEE802.11b-processed connection commands IEEE802.11b-CC, IEEE802.11b-processed connection parameters IEEE802.11b-CP, and IEEE802.11b-processed connection data IEEE802.11b-CD. This means, the Bluetooth connection commands BT-CC, Bluetooth connection parameters BT-CP, and Bluetooth connection data BT-CD are processed. Processing here can mean several aspects: It is for example possible that a Bluetooth connection command BT-CC corresponds to one or more IEEE802.11b connection commands IEEE802.11b-CC. The same applies to Bluetooth connection parameters BT-CP, i.e. one Bluetooth connection parameter BT-CP may be converted into one or more IEEE802.11b connection parameters IEEE802.11b-CP. It is also possible that several Bluetooth connection commands BT-CC and/or Bluetooth connection parameters BT-CP are converted into one single IEEE802.11b connection command IEEE802.11b-CC and one single IEEE802.11b connection parameter IEEE802.11b-CP, respectively.

In other words, the adaptation layer 117 takes care of all necessary steps for a standard conversion. An important aspect of the invention is thereby that the upper layers, i.e. the connection layer 119 and the application layer 113 do not notice the standard conversion by the adaptation layer 117. This means, the application layer 113 still communicates with the connection layer 119 via said Bluetooth application connection 103 according to the Bluetooth standard. Also, the connection layer 119 does not notice the standard conversion and therefore still provides Bluetooth connection commands BT-CC, Bluetooth connection parameters BT-CP, and Bluetooth connection data BT-CD to the adaptation layer.

The IEEE802.11b-processed connection commands IEEE802.11b-CC, the IEEE802.11b-processed connection parameters IEEE802.11b-CP, and the IEEE802.11-processed connection data IEEE802.11b-CD are then provided to an IEEE802.11b interface within the wireless layer 120. The wireless layer 120 then sends out these data as IEEE802.11b transmission data IEEE802.11b-TD via said IEEE802.11b wireless connection IEEE802.11b-WC.

The transmitted IEEE802.11b transmission data IEEE802.11b-TD are received by the respective IEEE802.11b interface of the wireless layer 120 of the notebook NB. Within the notebook NB, the data is processed in a more or less opposite way compared to the video camcorder CAMC. This means the IEEE802.11b connection commands IEEE802.11b-CC, the IEEE802.11b connection parameters IEEE802.11b-CP, and the IEEE802.11b connection data IEEE802.11b-CD that are contained in the IEEE802.11b transmission data IEEE802.11b-TD are provided to a respective adaptation layer 117 of the notebook NB. Within the adaptation layer of the notebook NB the IEEE802.11b commands, parameters and data are converted into Bluetooth connection commands BT-CC, Bluetooth connection parameters BT-CP, and Bluetooth connection data BT-CD. The Bluetooth connection command BT-CC, Bluetooth connection parameters BT-CP, and Bluetooth connection data BT-CD are then provided to the connection layer 119 of the notebook NB where a conversion into Bluetooth application commands BT-AC, Bluetooth application parameters BT-AP, and Bluetooth application data BT-AD is done. The obtained Bluetooth application commands BT-AC, Bluetooth application parameters BT-AP, and Bluetooth application data BT-AD are then provided to an application layer 113 of the notebook NB. Within the application layer 113, the video data that are contained in the Bluetooth application data BT-AD are displayed on a display DIS.

Figure 4:
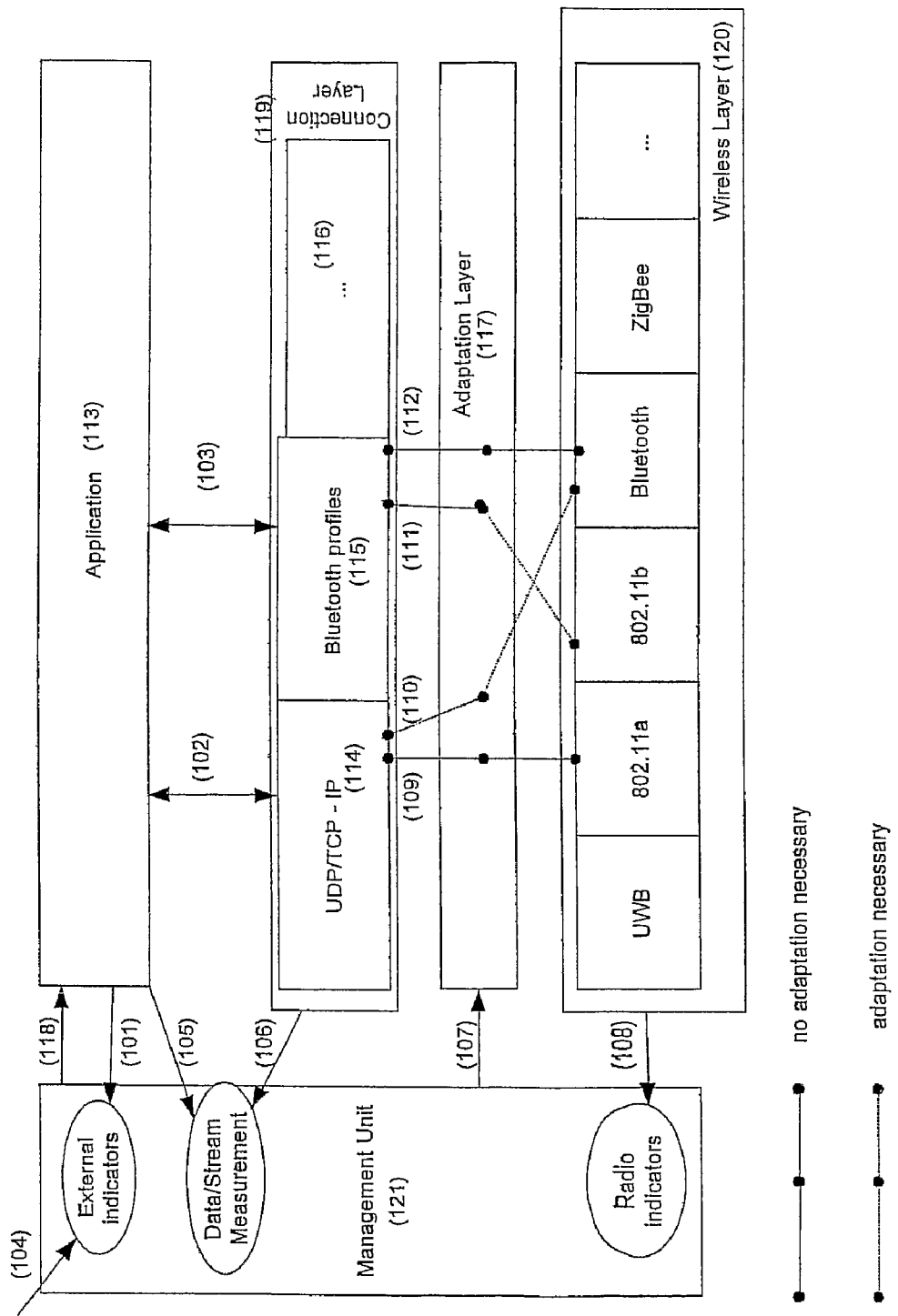
FIG. 4 shows a block diagram for explaining further steps of the inventive method and units of the invention.

FIG. 4 shows another important aspect of the invention, wherein a management unit 121 is used to control the switching of a multimedia device to a different wireless standard. The architecture of FIG. 4 can be applied for a multimedia device that is sending data as well as for a multimedia device receiving data. This means, in the example of FIG. 2 and FIG. 3, the architecture of FIG. 4 may be applied in the video camcorder CAMC and the notebook NB.

The management unit 121 decides to switch to a different wireless standard depending on several events. For example, the management unit 121 may observe the signal strength of the wireless connection of the multimedia device via a radio indicator 108. If the signal strength of a currently used wireless connection becomes low, the management unit 121 may observe the signal strength that is obtainable with other available wireless standards. In case the obtainable signal strength of another wireless standard is better, the management unit 121 may decide to switch to this other wireless standard. The management unit 121 therefore uses the switching signal 107 that is provided to the adaptation layer 117. The adaptation layer 117 then takes care of all the necessary steps to establish a new connection of the other wireless standard. Further, the adaptation layer performs all the above explained steps for a standard conversion.

The management unit 121 may also observe the quality of service of the data stream via the data stream signals 105 and 106. This means, the management unit 121 performs a data stream measurement. Based on the quality of service, the management unit 121 may choose to use a different wireless standard than the current wireless standard. If e.g. the quality of service becomes poor, the management unit 121 may choose a different wireless standard enabling a better quality of service.

A further external indicator is e.g. a frequency band indicator. For example, Bluetooth and IEEE802.11b are operating in the same frequency band. If Bluetooth is disturbed due to an other radio signal in that frequency band, it is very likely that also IEEE802.11b will be disturbed and it would not make sense to switch to IEEE802.11b. However, IEEE802.11a is operating in another frequency band, so if the frequency band indicator signals that another frequency band is currently better suited, this will be an important aspect for the management unit.

The management unit 121 may also receive external information via an external signal 104. For example, the measurement unit 121 may be provided with positioning data GPS via said external signal 104. The positioning data may indicate the position of the multimedia device and the position of another multimedia device that is connected to the multimedia device via the wireless connection. The measurement unit 121 may calculate the distance between the two devices from these positions and decides to switch to a different standard, in case the distance takes on a value greater than a predetermined threshold value.

In any case, if the management unit 121 decides that the wireless standard should be switched, this is done via the switching signal 107.

The management unit 121 may also observe the battery condition, i.e. the battery level of the multimedia device. If the battery becomes low, i.e. the remaining power of the battery becomes low, the management unit 121 may decide to switch to another wireless standard that consumes less energy than the current wireless standard. If e.g. the current wireless standard used is the IEEE802.11a standard having a relatively high power consumption (see FIG. 1), in case the management unit 121 notices that the battery becomes low, the management unit 121 may switch to the Bluetooth BT standard that requires significantly less energy.

The aspect of observing the remaining power within the battery may help to prolong the total time that a multimedia device can be used by the user.

The management unit 121 may also be informed by the application 113 via an external indicator 101 to switch to a different wireless standard. This means, if the application 113 decides to switch to a different wireless standard, then the management unit 121 sends out the switching signal 107 to the adaptation layer 117 indicating the desired wireless standard to switch to.

In some cases it might be necessary that the management unit 121 informs the application 113 of the standard switching. This is done via a standard information signal 118. The management unit 121 may need to inform the application 113 because of different bit rates of the new wireless standard that is switched to. The application 113 consequently may adapt the bit rate of the sent out data stream.

FIG. 4 further shows several connections of the multimedia device. The application 113 has a TCP/UDP handle 102 and consequently exchanges data with the TCP/UDP connection layer 114 in the connection layer 119. The TCP/UDP connection layer 114 has a directly mapped TCP/UDP connection 109 with an IEEE802.11a interface of the wireless layer 120. In this case, no standard conversion is performed by the adaptation layer 117. However, the management unit 121 may signal to the adaptation layer 117 via the switching signal 107 to switch to the Bluetooth standard. In this case, the adaptation layer 117 establishes a Bluetooth BT connection. After the establishment of the Bluetooth BT connection, the adaptation layer 117 performs a standard conversion as explained above. This means, that the data is now mapped to the Bluetooth BT interface of the wireless layer 120 using a converted TCP/UDP connection 110.

FIG. 4 also shows another example, where the wireless standard is switched from Bluetooth to IEEE802.11b standard. In this example, the application 113 has a Bluetooth handle 103 from the Bluetooth connection layer 119. Before the standard switching, the Bluetooth connection layer 115 has a directly mapped Bluetooth connection 112 with the Bluetooth interface of the wireless layer 120. After the management unit 121 has sent out the switching signal 107 indicating the switching to the IEEE802.11b standard, the adaptation layer 117 establishes an IEEE802.11b connection. After the establishment of the IEEE802.11b standard connection, the adaptation layer 117 starts the standard conversion of the Bluetooth standard to the IEEE802.11b standard. This means, that all the data that has been sent via the directly mapped Bluetooth connection 112 before the switching is now sent to the IEEE802.11b interface via a converted Bluetooth connection 111.

Figure 5:
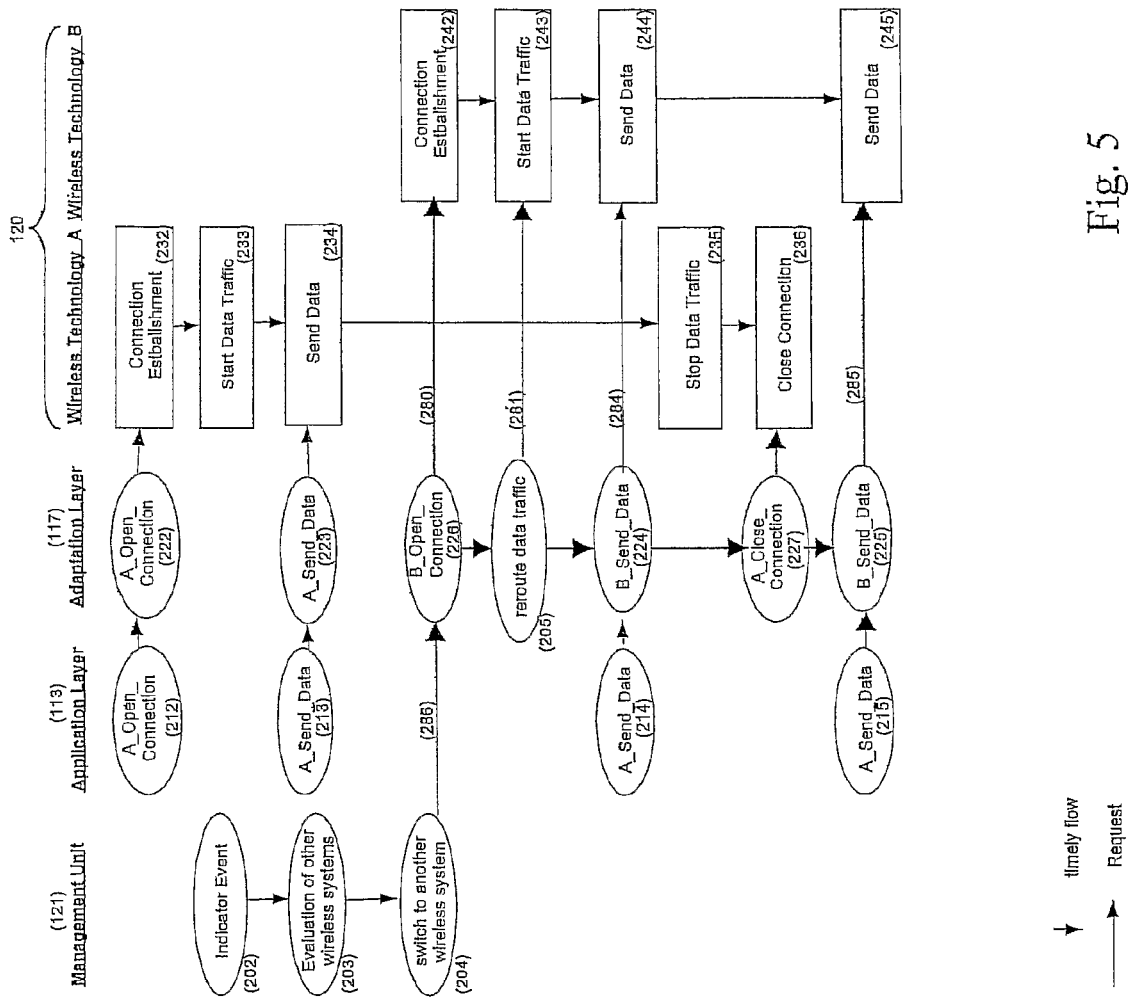
FIG. 5 shows a diagram illustrating the steps performed by the different units and/or layers in a general way.

FIG. 5 shows the different steps that are executed in order to enable a seamless switching from a wireless technology A to a wireless technology B within the wireless layer 120.

Before the switching from wireless standard A (wireless technology A) to wireless standard B (wireless technology B) is explained, steps for opening a connection according to wireless standard A are explained.

In a step 212, the application layer 113 sends a command "A_Open_Connection" to the adaptation layer 117. The adaptation layer 117 accordingly sends out a command "A_Open_Connection" in a further processing step 222 to the wireless unit of the wireless technology A within the wireless layer 120. The wireless unit of wireless technology A therefore establishes a connection in the step 232. Then, the data traffic is started in a step 233. After the data traffic has started, the application layer 113 starts sending data by a command "A_Send_Data" in a step 213. The adaptation layer 117 therefore sends a command "A_Send_Data" in a step 223. Therefore, the wireless unit within the wireless layer 120 sends data in a step 234.

While data is sent via wireless technology A, the management unit 121 receives an indicator event in a step 202. The management unit 121 therefore evaluates other wireless systems in a step 203. In case the management unit 121 decides that wireless technology B is better suited with respect to e.g. quality of service, signal strength and/or power consumption, the management unit 121 may switch to an other wireless system in a step 204. The management unit 121 therefore sends a signal 286 to the adaptation layer 117. Upon receiving this signal 286 from the management unit 121, the adaptation layer 117 sends a signal 280 to the wireless unit of wireless technology B. Wireless unit of wireless technology B then establishes a connection according to wireless technology B in step 242. After the connection of wireless technology B has been established, the adaptation layer 117 starts rerouting data traffic in step 205. The adaptation layer 117 therefore sends a respective signal 281 to the wireless unit of wireless technology B. The wireless unit of wireless technology B thereupon starts data traffic in a step 243.

After the connection of wireless technology B has been established, the application layer 113 continues sending data with the command "A_Send_Data" in step 214. The adaptation layer 117 receives this command and converts it to the wireless standard B. In this case this means that the adaptation layer 117 converts the command "A_Send_Data" into "B_Send_Data" as indicated within step 224. The adaptation layer 117 then provides the data according to the wireless standard B to the wireless unit of wireless technology B via the signal 284. The wireless unit of wireless technology B sends the data according to the wireless standard B in a step 244.

Since the wireless connection of wireless technology A is not needed anymore, the data traffic is stopped in a step 235. The adaptation layer 117 therefore sends a command "A_Close_Connection" in a step 227 to the wireless unit of wireless technology A. The wireless unit of wireless technology A then closes the connection in a step 236.

The application layer 113 does not notice the switching from wireless technology A to wireless technology B. This means, the application layer 113 continues to send data by using the command "A_Send_Data" (step 215). The adaptation layer converts the command "A_Send_Data" into the command "B_Send_Data". The data is provided to the wireless unit of wireless technology B via the signal 285 and sent out in step 245.

As can be seen from the above example, the application layer 113 does not notice at all that the wireless standard has been switched from the wireless standard A to wireless standard B. The application layer 113 therefore still sends data according to the command set of wireless technology A. In other words, the application layer 113 still sends application commands, application parameters, and application data according to a first wireless standard that is used prior to the switching of the wireless channel standard.

Figure 6:
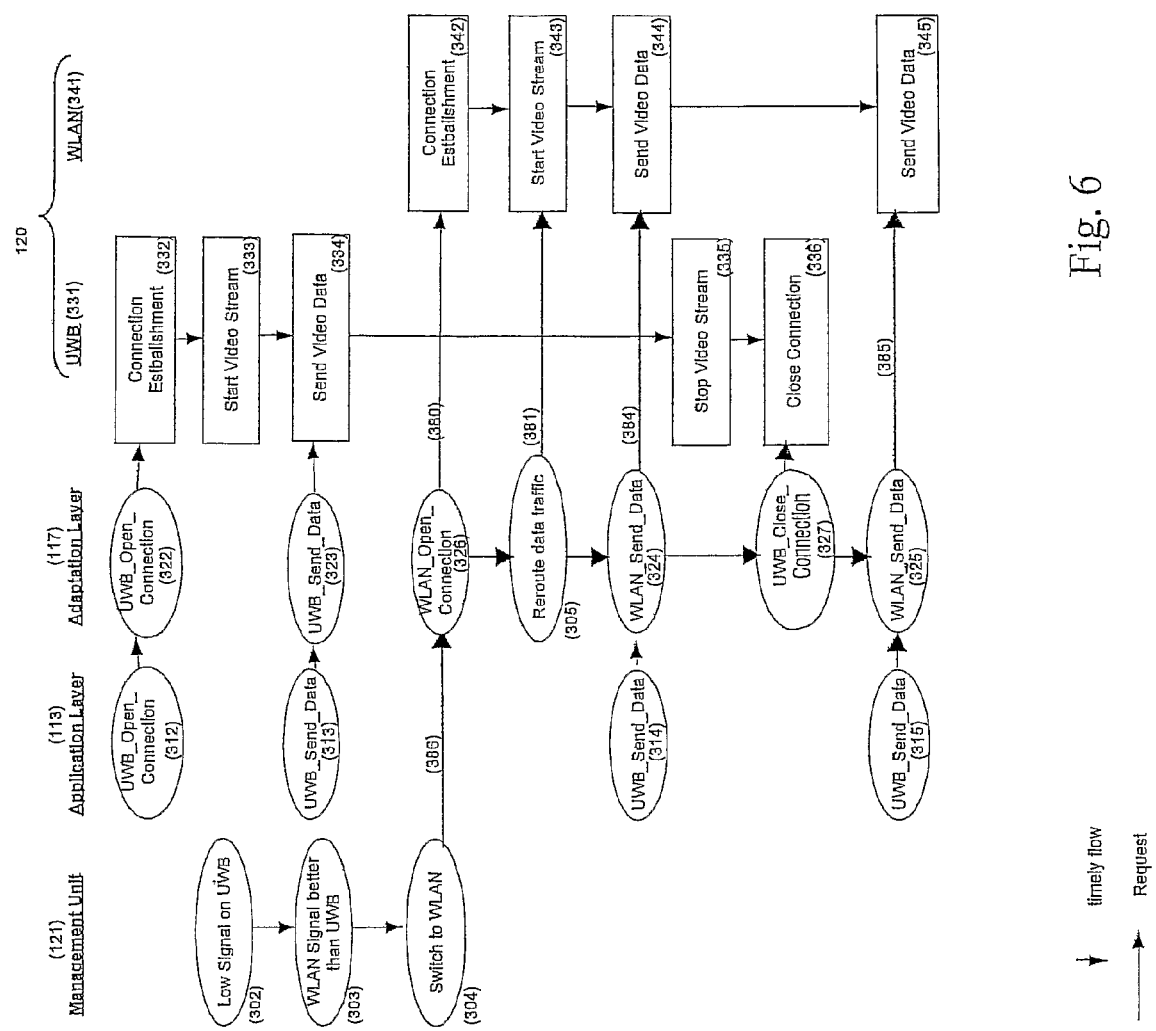
FIG. 6 shows a diagram illustrating the steps performed by the different units and/or layers in a specific embodiment.

FIG. 6 shows a diagram similar to that of FIG. 5 illustrating similar steps, wherein wireless technology A is now ultra wide band UWB, and wireless technology B is now wireless local area net WLAN. Therefore, in a step 312, the application layer 113 sends a command "UWB_Open_Connection" to the adaptation layer 117. Upon receiving this command, the adaptation layer 117 sends a command "UWB_Open_Connection" to the UWB unit of the wireless layer 120 (step 322). Upon receiving this signal, the UWB unit of the wireless layer 120 establishes a connection in step 332 and starts the video stream (step 333). After the video stream has been started, the application layer 113 sends data "UWB_Send_Data" (step 313) to the adaptation layer 113. The adaptation layer 117 sends data to the UWB unit using the command "UWB_Send_Data" (step 323). The UWB unit sends the video data in step 334.

While the video data is sent out according to the ultra wide band UWB standard, the management unit 121 notices a low signal of the ultra wide band UWB in a step 302. The management unit 121 further detects that the WLAN signal is better, i.e. stronger, than the ultra wide band UWB signal in a step 303. The management unit 121 therefore decides to switch to the wireless local area network WLAN standard in step 304. The management unit 121 therefore sends a signal 386 to the adaptation layer 117. In a step 326 the adaptation layer 117 therefore sends a command "WLAN_Open_Connection" to the wireless local area network WLAN unit 341 using signal 380. Signal 380 is received by the wireless local area network WLAN unit 341 and wireless local area network WLAN unit 341 therefore establishes a WLAN connection in a step 342. The adaptation layer 117 then starts to reroute data traffic in a step 305 using signal 381. Upon receiving signal 381, wireless local area network WLAN unit starts a video stream in a step 343.

After the video stream of the WLAN unit has been started, the application layer 113 continues sending data by using the command "UWB_Send_Data" in step 314. However, the adaptation layer 117 now converts this command into the command "WLAN_Send_Data" in step 324. Respective WLAN data is then sent to the WLAN unit via signal 384, and video data is sent out in step 344 according to the WLAN standard. After successful establishment of the WLAN connection and successful data sending according to the WLAN standard, the video stream of the UWB connection is stopped in step 335.

The adaptation layer 117 then sends a command "UWB_Close_Connection" to the ultra white band UWB unit in a step 327. The UWB unit therefore closes the connection in step 336.

After the connection of the UWB unit has been closed, the application 113 continues to send data by using the command "UWB_Send_Data" (step 315). This command is converted to "WLAN_Send_Data" within the adaptation layer 117 in step 325. The data is provided to the WLAN unit of wireless layer 120 via signal 385. The WLAN unit sends the data according to the WLAN standard (step 345).

The following further elucidations may help a person skilled in the art to get a better understanding of the invention:

The introduced invention allows seamlessly switching between different wireless technologies on a point-to-point connection without breaking an ongoing data stream. It therefore enables to use the wireless technology that is best suited to a certain situation and can adapt to changing situations in mobile scenarios by switching to another wireless technology.

State of the Art:

Some work has been done in the seamless handover between WLAN and WMAN networks. This work is related to the competition of both technologies in certain areas, for example network access points in airports and other dense areas. However, this usage scenario typically involves a network provider, resulting in a topology that is fundamentally different to the one used in this invention.

The known state of the art does not address a dynamic change of transmission protocol standards/systems and data formats. Prior art is concerned with a dynamically changing network topology and the problem of re-routing the traffic at the correct point in time. In the known state of the art, the used protocol/standard/system remains unchanged when the switch happens, that means the protocols are defined in such a way that they support a handover.

Also, in prior art the usage scenario is targeted at a user roaming different network access points that are connected over one backbone, whereas the invention targets at wireless point-to-point connections and the optimisation of power consumption.

In connection with a bridging apparatus for interconnecting a wireless PAN and a wireless LAN it is described how a WLAN can be used as a backbone for Bluetooth access points when the Bluetooth access points are further away from each other than the range of Bluetooth and a user with the mobile client device temporarily has to leave the range of one Bluetooth access point to get into the range of the other Bluetooth access point. In this case, the mobile client device is only capable of Bluetooth, not of WLAN. WLAN is only used to connect the two Bluetooth access points. Therefore, it describes another case of usage with a different topology.

Further, in connection with methods and systems for enabling seamless roaming of mobile devices among wireless networks it is described how a mobile device can seamlessly be moved between different access points with different wireless technologies, when all access points are connected to the Internet. Therefore, the topology is different from the one described in this invention.

In automatic and seamless vertical roaming between wireless local area network (WLAN) and wireless wide area network (WWAN) an active voice or streaming data connection can be maintained. It is described how to do handovers of mobile devices between WLAN access points and GSM base stations. This leads to a topology and usage scenario different from the one that is described in this invention.

Further advantageous details of the invention are described in the following:

Different possibilities exist today for different wireless technologies to transfer files and do media streaming between two devices. For example, there have been several demonstrations of using Bluetooth wireless technology to stream a video from a source to a sink. The same has been done for the different WLAN systems and is part of the use cases for upcoming technologies like ultra wide band (UWB).

Each technology has its advantages, very much depending on the situation. Bluetooth has been optimised for low power consumption, but for many devices does not cover more than 10 meters range. WLAN has a wider range and a higher bit rate, but consumes significantly more power. FIG. 1 shows some examples of how different wireless technologies relate to each other in terms of range, bit rate and power consumption. Already today, there are multimedia devices that have multiple wireless technologies built in, for example Bluetooth and WLAN in PCs. In the future, even more devices will have multiple wireless technologies on board.

Therefore, it is desirable to use each of the different technologies depending on the current situation. As FIG. 2 shows, a wireless mobile camera connected to the personal computer (notebook NB in FIG. 2) should run on Bluetooth when there is no need for high bit rate, the camera needs to take care on power consumption and the distance is not too large. If, however, the mobile camera will be moved out of the range of Bluetooth, it would loose its connection.

This invention inter alia describes a way how the devices can switch to another wireless technology without breaking for example an ongoing video stream or data transfer, optimising power consumption. In the above example, WLAN could be used to extend the range at the cost of a higher power consumption outside the Bluetooth range, see FIG. 2.

Currently, it is possible to use most of the WPAN/WLAN technologies described in this invention on their own for connecting two devices. However, no prior art is known on approaches to profit from the overlaps between the technologies in terms of power consumption, range and usage scenarios in the way described in this invention. A major usage of the introduced invention is to optimise power consumption by choosing the optimum wireless technology depending on the current situation.

In order to seamlessly switch from one wireless technology to another without breaking an ongoing data transmission (e.g. media stream or file transfer), an adaptation layer is introduced to encapsulate the lower layers from the application. Most of the technologies applicable for this invention use the Internet Protocol IP as network layer. This invention leverages this fact, but is not limited to IP.

The invention e.g. includes an architecture introducing an adaptation layer and a sequence of events and actions that is used to execute the seamless handover.

In some cases, the application does not have to be aware of the switch to another wireless technology in the lower layers. In other cases, however, it is inevitable that the application is aware in order to take certain actions like reducing the bit-rate of a video stream.

The architecture of the described system is depicted in FIG. 4. It contains an application layer 113, a connection layer 119, an adaptation layer 117, a wireless layer 120 and a management unit.

The application layer 113 implements the actual application. In the case of a file transfer, for example, this includes all tasks related to providing the data that is to be transferred. This may include user interface, directory access, etc. In the case of media streaming, the application is typically responsible for providing the media frames in a timely manner. The application may be regarded as the user of the service provided by this invention. The application refers to a certain connection using a connection handle. In case of an IP connection this is also referred to as a socket.

The application typically establishes a wireless connection to another device using the services of the connection layer 119. In the case of IP as network protocol, in return the application may receive a TCP or UDP connection handle, or in the case of Bluetooth a corresponding handle of one of the Bluetooth profiles. The connection request and handles are exchanged over 102 and 103. The architecture is open to include other wireless technologies 116 into the connection layer. Open here means that the invention is not limited to the current mentioned standards and/or specifications. It can easily be applied to future specifications, standards, and/or systems, especially to proprietary systems.

The adaptation layer 117 is responsible for mapping the connection from the connection layer to the wireless layer. In case of a direct mapping, for example from a Bluetooth profile to the Bluetooth core layers (wireless layer), the adaptation layer can remain inactive. The connections 109 and 112 are examples for such a direct mappings. In other cases, the adaptation layer has to emulate the functionality of a particular wireless technology. In case a Bluetooth profile should run over zigBee, for example, the adaptation layer has to take care that the connection layer only sees Bluetooth functionality, although this is mapped to zigBee functionality inside the adaptation layer. Examples for such an emulation are the connections 110 and 111.

The task of the adaptation layer can be separated into three sub-tasks: Command conversion, parameter conversion and data conversion. For example, command conversion translates a command received from the application in 'Bluetooth language' into a corresponding command in 'WLAN language' to be sent to the wireless layer. Such a command may contain several parameters. Parameter conversion has to be done to convert these parameters. For example, in Bluetooth the length of a packet is described in bytes, in other wireless systems this might be described in milliseconds. Finally, data conversion may be needed when a certain data format has to be mapped to another data format. An example is an audio codec. Over Bluetooth, mp3 might be used, but another wireless system may require to transcode this into linear PCM.

The wireless layer 120 contains all the core functionality for the different wireless technologies that are available to the system. As examples, FIG. 4 contains ultra wide band, 802.11a+b, Bluetooth and zigBee, but the architecture can easily be extended to other wireless technologies.

Finally, the architecture contains a management unit 121. This unit continuously evaluates data from different sources in order to be able to judge which wireless technology best fits the requirements in the current situation. Examples for sources taken into account by the management unit are Radio Indicators 108 (e.g. signal strength), measurements of the quality of the sent stream 105,106 (e.g. number of lost packets) or external indicators 104,101 (e.g. positioning data from GPS, direct requests from the application, etc). After evaluation of all this input, the management unit may request the adaptation layer to switch to another wireless technology, using 107. In some cases it is necessary to also inform the application via 118. The application, for example, may need to adjust the bit-rate of a video codec.

FIG. 5 shows the sequence of events and actions that are executed when the system switches from one wireless system to another wireless system. There are five columns for the flow of events, for the management unit 121, for the application layer 113, for the adaptation layer 117, for wireless system A and for wireless system B.

An application originally establishes a connection by sending a request (step 212) to wireless system A (step 232) via the application layer (step 222). At this moment, the application layer pretends to be wireless system A by accepting commands, parameters and data in exactly the same format as is defined for the interface of wireless Technology A. At this moment, the open request (step 212) received from the application is simply forwarded as an open request (step 222) to wireless system B without any modification. Wireless system A receives the request and actually establishes the connection (step 232) and prepares the connection for the transport of data traffic (step 233).

Then the application actually sends data by sending a request in the format for wireless system A (step 213). The adaptation layer receives this and forwards it (step 223) to wireless system A without any change. Wireless system A transports the data to the remote side (step 234).

In the meanwhile, an Indicator Event (step 202), e.g. a signal strength indicator, and the evaluation of other wireless systems (step 203) may indicate that it is more efficient to switch (step 204) to wireless system B in the current situation. The management unit therefore sends a signal 286 to the adaptation layer 117. Upon receiving this signal 286, the adaptation layer 117 sends a command "B_Open_Connection" to wireless system B using signal 280. Wireless system B then establishes a connection in step 242. Adaptation layer 117 then starts to reroute data traffic (steps 205, 281, and 243).

The application keeps on sending data without being aware of this, i.e. still sending commands, parameters and data in the format of wireless system A (step 214) to the adaptation layer. After the rerouting has been achieved, however, the adaptation layer 117 no longer simply forwards the request to wireless system A, but instead transforms it into a command with parameters and data in the format of wireless system B (step 224) and sends this as a request to wireless system B (step 284). Wireless system B then transports the data to the remote side (step 244). The transformation of a request for wireless system A into a request for wireless system B in this step may include a translation of one command into one or more commands in another format, the transformation of parameters into one or several parameters in another format and the transformation of data from one format into another format. In case of media streaming, for example, this transformation of data formats could include transcoding from one codec format into another.

During this time, wireless system A may still have the connection active, although it is not used for traffic any more. Therefore, the adaptation layer 117 may decide to disconnect it (step 227) and closes the connection (steps 235, 236).

All data that is sent by the application afterwards is transformed by the adaptation layer in the way described above (steps 215, 225, 285, 245). This means that the adaptation layer pretends to be wireless system A, although it is internally translating and routing all commands, parameters and data to wireless system B. The application is not aware that there has been a change in the lower layers and therefore can seamlessly continue any data traffic, for example media streaming, without any interruption.

Embodiment:

A typical application scenario of the described invention is a video camcorder that is wirelessly connected to a laptop computer, i.e. a notebook. Both, the laptop and the camcorder have two wireless technologies built in: ultra wide band UWB and WLAN. At the moment of the original connection, the camcorder is only a few centimeters away from the laptop. Therefore, UWB is chosen as wireless system for this original connection. For short distances, it provides higher data rates and lower power consumption than WLAN. After connecting, the user starts to stream video from the camcorder to the laptop.

The user then starts moving around with the camcorder. Doing so, he leaves the 10 meter range that is covered by UWB. FIG. 6 shows the flow of actions and events that takes place within the management unit 121, the application layer 113, the adaptation layer 117, the UWB scope 331 and the WLAN scope 341.

At the beginning, the user chooses to connect the camcorder and the laptop. This leads to a corresponding request from the application layer to the UWB layer via the adaptation layer 113, 117. In this case, no translation inside the adaptation layer is needed, the command with its parameters is simply forwarded to the UWB layer and there it is being executed (steps 332, 333). Then, the actual video streaming starts and data is sent from the application (step 313) via the adaptation layer (step 323) to the UWB layer. Again, there is no need for the adaptation layers to translate the command or transform the data. It can simply be forwarded, because the application already uses the format for the UWB layer.

When the user moves around with the camcorder and passes beyond the 10 m range, the signal level for UWB may get too low. This is indicated (step 302) to the Managements Unit that realizes that the signal on WLAN is better (step 303) and therefore decides to switch to WLAN (step 304) and reroute the data traffic (step 305) by opening a WLAN connection (steps 304, 386, 326, 380) and preparing it for streaming data transport (steps 305, 381, 343).

The application in the meanwhile keeps on sending video data packets, still in the format for UWB (step 314). However, since the traffic has been rerouted to WLAN, the adaptation layer translates the commands and transforms the video packets into the format of WLAN and sends it as a "Send_Data" request to WLAN (steps 324, 384). This step may include a transcoding from one video codec to another, for ex ample from MPEG-4 to MPEG-2.

Because it is inefficient to maintain the UWB channel when no traffic is running over it, the adaptation layer 117 decides to disconnect and close the UWB connection (steps 327, 335, 336). All streaming video packets that the application sends from then (step 315) on are being translated and transformed (steps 325, 345) as described above.

It is essential that the whole time, the application continues to stream in the way it has started the stream with. Although there is a significant change in the lower layers, i.e. a switch of the transport bearer, there is no change at all for the application and therefore no negative effects for the user. Without the invention, the application would have to stop the stream, establish another connection and the restart the stream on the new connection. The user would recognize this due to a visible break of the presented video.

Abbreviations and Standards:
Bluetooth:
 Short-range wireless personal area network technology.
 Low Power Cable replacement technology
 Range 10-100 meters
 Bit-rate up to 720 kbps
 Operation in 2.4 Ghz band UWB:
 Ultra-Wide-Band
 Short-Range wireless personal area network technology
 Range up to 10 meters
 Low Power
 Bit-rate more than 50 Mbps
 Idea is to spread among the whole frequency band
 Will be used for IEEE802.15.3a
IEEE 802.15/WPAN:
 Wireless Personal Area Networks WPAN
 802.15.1: Equivalent to Bluetooth
 802.15.3: Targeting wireless multimedia applications
 802.15.3a: Targeting wireless multimedia applications
 802.15.4: Basis for zigBee: Wireless home appliances
 Lower Power Consumption than WLAN
IEEE 802.11/WLAN:
 Wireless Local Area Network WLAN
 Targeting the office environment
 802.11a: ~50 Mbps in 5 Ghz band
 802.11b: ~11 Mbps in 2.4 Ghz band
 802.11g: ~50 Mbps in 2.4 Ghz band
 Higher Power Consumption than WPAN
zigBee:
 Target is to connect home appliances
 Example light switch: It may be cheaper to put a small radio transceiver into the lamp and the switch than to put a cable into the wall
 Extremely low power consumption 2 years battery life
 Low bit-rate (250 kbps)
IETF:
 Internet Engineering Task Force
 Responsible to define protocols for the internet world
Mp3:
 MPEG layer three audio
 Codec used to reduce the data needed for audio files/streams
Linear PCM:
 Format for raw audio data (not encoded)

| Reference Symbols | |
|---|---|
| 101 | external indicator |
| 102 | TCP/UDP handle |
| 103 | Bluetooth application connection |
| 103 | Bluetooth handle |
| 104 | external signal |
| 105, 106 | data stream signal |
| 107 | switching signal |
| 108 | radio indicator |
| 109 | directly mapped TCP/UDP connection |
| 110 | converted TCP/UDP connection |
| 111 | adaptation layer connection |
| 111 | converted Bluetooth connection |
| 112 | directly mapped Bluetooth connection |
| 113 | application layer |
| 114 | TCP/UDP connection layer |
| 115 | Bluetooth connection layer |
| 116 | further connection layers |
| 117 | adaptation layer |
| 118 | standard information signal |
| 119 | connection layer |
| 120 | wireless layer |
| 121 | management unit |
| BT | Bluetooth standard |
| BT-AC | Bluetooth application commands |
| BT-AD | Bluetooth application data |
| BT-AP | Bluetooth application parameters |
| BT-CC | Bluetooth connection commands |
| BT-CD | Bluetooth connection data |
| BT-CP | Bluetooth connection parameters |

-continued

| Reference Symbols | |
|---|---|
| CAMC | video camcorder |
| DSM | data storage means |
| IEEE802.11b-CC | IEEE802.11b-processed connection commands |
| IEEE802.11b-CD | IEEE802.11b-processed connection data |
| IEEE802.11b-CP | IEEE802.11b-processed connection parameters |
| IEEE802.11b-TD | IEEE802.11b transmission data |
| IEEE802.11b-WC | IEEE802.11b wireless connection |
| NB | notebook |
| UWB | ultra wide band |
| WLAN | wireless local area network |

The invention claimed is:

1. A method for wireless data transfer, performed by a first multimedia device, for exchanging data with a second multimedia device, in which the first multimedia device and the second multimedia device are connected via a point-to-point wireless connection that is operable according to a first wireless data transfer standard and to a second wireless data transfer standard, and in which the first wireless data transfer standard and the second wireless data transfer standard are different from and not compatible with each other, said method comprising:
application data receiving in which application commands, application parameters, and application data of the first wireless data transfer standard are received by the first multimedia device from an application of the first multimedia device;
thereafter, transmitting data, in a data transmission, from the first multimedia device according to the first wireless data transfer standard by performing connection layer processing in which the application commands, application parameters, and application data are processed by the first multimedia device to obtain respective connection commands, connection parameters, and connection data according to the first wireless data transfer standard;
thereafter, while transmitting data in the data transmission from the first multimedia device to the second multimedia device according to the first wireless data transfer standard, determining to switch from the first wireless data transfer standard to the second wireless data transfer standard; and
thereafter, switching from the first wireless data transfer standard to the second wireless data transfer standard, by the first multimedia device, so as to switch from transmitting data, in the data transmission, according to the first wireless data transfer standard to transmitting data, in the data transmission, according to the second wireless data transfer standard without interruption of the data transmission, the switching including performing adaptation layer processing in which a standard conversion is performed, the standard conversion processing including converting the connection commands, connection parameters, and connection data from the connection layer processing, which are in accordance with the first wireless data transfer standard, into respective processed connection commands, processed connection parameters, and processed connection data, which are in accordance with the second wireless data transfer standard.

2. A method according to claim 1, wherein the standard switching comprises:
opening a new temporary wireless connection between the first multimedia device and the second multimedia device, the new temporary wireless connection operating according to the second wireless data transfer standard; and
terminating the currently applied first wireless data transfer standard based on a determination of a need for the second wireless data transfer standard.

3. A method according to claim 1, wherein the method for wireless data transfer realizes a point-to-point connection between the first multimedia device and the second multimedia device.

4. A method according to claim 1, wherein the adaptation layer processing is performed within an adaptation layer.

5. A method according to claim 1, wherein the determining to switch from the first wireless data transfer standard to the second wireless data transfer standard is based on properties of the wireless connection according to the first wireless data transfer standard, including a distance between the first multimedia device and the second multimedia device.

6. A method according to claim 5, wherein the properties of the wireless connection comprise signal strength, quality of service, and energy efficiency.

7. A method according to claim 6, wherein the management unit informs the application that the standard switching to the second wireless data transfer standard is determined, and the application, in response to the informing, adjusts a bit rate of the application data depending on the second wireless data transfer standard.

8. A method according to claim 5, wherein the distance between the first multimedia device and the second multimedia device is determined based on positioning system data.

9. A method according to claim 5, wherein the determining is performed by a management unit.

10. A method according to claim 1, wherein the determining to switch from the first wireless data transfer standard to the second wireless data transfer standard is based on a battery condition of at least one of the first multimedia device and the second multimedia device.

11. A method according to claim 1, wherein the first multimedia device is a video camcorder and the second multimedia device is a data processing means.

12. A method according to claim 11, wherein the data processing means is a personal computer, a notebook, a video recorder, a television set, a personal digital assistant, a portable phone, a stereo headphone, or a mobile video viewer.

13. A method according to claim 1, wherein
the first wireless data transfer standard and the second wireless data transfer standard are any of the following standards: IEEE 802.11a, IEEE 802.11b, Bluetooth (BT), ZigBee, and IEEE 802.15.3; and
the connection commands, connection parameters, or connection data correspond to any of the following standards: UDP/TCP, Bluetooth (BT).

14. A wireless data transfer system configured to perform a method for wireless data transfer according to claim 1.

15. A computer program product comprising computer program means adapted to perform a method for wireless data transfer according to claim 1, when the method is executed on a computer or a digital signal processing means.

16. A non-transitory computer-readable storage medium comprising a computer program product according to claim 15.

17. A method for wireless data transfer, performed by a first multimedia device, for exchanging data with a second multimedia device, in which the first multimedia device and the second multimedia device are connected via a point-to-point wireless connection that is operable according to a first wireless data transfer standard and to a second wireless data transfer standard, and in which the first wireless data transfer standard and the second wireless data transfer standard are different from and /not compatible with each other, said method comprising:
  receiving a data transmission, by the second multimedia device, including data transmitted according to the first wireless data transfer standard from the first multimedia device;
  thereafter, adaptation layer processing in which, after the data transmission has switched from being received by the second multimedia device according to the first wireless data transfer standard to being received according to the second wireless data transfer standard without interruption of the data transmission, a standard conversion is performed by the second multimedia device, the standard conversion including processing data transmitted in the data transmission according to the second wireless data transfer standard to obtain connection commands, connection parameters, and connection data according to the first wireless data transfer standard;
  connection layer processing in which the connection commands, connection parameters, and connection data resulting from the adaptation layer processing are converted into respective application commands, application parameters, and application data according to the first wireless data transfer standard; and
  an application data processing executed by the second multimedia device, wherein the converted application commands, application parameters, and application data resulting from the connection layer processing are provided to an application of the first multimedia device.

18. The method according to claim 17, further comprising:
  opening a new temporary wireless connection between said first multimedia device and said second multimedia device, the new temporary wireless connection operating according to said second wireless data transfer standard; and
  terminating the currently applied first wireless data transfer standard based on a determination of a need for the second wireless data transfer standard.

19. A multimedia device connectable with a further multimedia device via a point-to-point wireless connection that is operable according to a first wireless data transfer standard and to a second wireless data transfer standard, in which the first wireless data transfer standard and the second wireless data transfer standard are different from and/not compatible with each other, the multimedia device comprising:
  a connection layer configured to receive application commands, application parameters, and application data of the first wireless data transfer standard from an application layer, and further configured to process the application commands, application parameters, and application data to generate respective connection commands, connection parameters, and connection data according to the first wireless data transfer standard, the application layer providing access to a data storage unit of the multimedia device which stores data;
  a transmission unit configured to transmit a data transmission including the connection commands, connection parameters, and connection data generated by the connection layer according to the first wireless data transfer standard;
  a managing unit configured to determine whether to switch from the transmitting the data transmission according to the first wireless data transfer standard to transmitting the data transmission according to the second wireless data transfer standard, the managing unit further configured to seamlessly switch from transmitting the data transmission according to the first wireless data transfer standard to transmitting the data transmission according to the second wireless data transfer standard, when transmitting the data stored in the data storage unit, after the connection layer has generated the connection commands, connection parameters, and connection data according to the first wireless data transfer standard; and
  an adaptation layer configured to, after the managing unit switches from transmitting the data transmission according to the first wireless data transfer standard to transmitting the data transmission according to the second wireless data transfer standard when transmitting the data stored in the data storage unit, perform a standard conversion, the standard conversion including converting the connection commands, connection parameters, and connection data generated by the connection layer into respective processed connection commands, processed connection parameters, and processed connection data according to the second wireless data transfer standard, wherein
  the transmission unit is configured to transmit the data transmission, including the processed connection commands, processed connection parameters, and processed connection data resulting from the adaptation layer via the wireless connection according to the second wireless data transfer standard Go as to transmit the data stored in the data storage unit.

20. The multimedia device according to claim 19, wherein the multimedia device is a video camcorder, personal computer, notebook, video recorder, television set, personal digital assistant, or a portable phone.

21. The multimedia device according to claim 19, wherein the adaptation layer is configured to:
  when the managing unit switches from the first wireless data transfer standard to the second wireless data transfer standard, open a new temporary wireless connection between said first multimedia device and said second multimedia device, the new temporary wireless connection operating according to said second wireless data transfer standard; and
  terminate the currently applied first wireless data transfer standard based on a determination of a need for the second wireless data transfer standard.

* * * * *